United States Patent
Ryner et al.

(10) Patent No.: US 10,010,170 B2
(45) Date of Patent: Jul. 3, 2018

(54) MODULAR STORAGE SYSTEM

(71) Applicant: PLANEX DESIGN PTY LTD, Hallam, Victoria (AU)

(72) Inventors: Leo Ryner, Lilyfield (AU); Jean-Pierre Jardel, Ferny Creek (AU)

(73) Assignee: Planex Design Pty Ltd, Hallam, Victoria (AU)

( * ) Notice: Subject to any disclaimer, the term of this patent is extended or adjusted under 35 U.S.C. 154(b) by 0 days.

(21) Appl. No.: 15/510,713

(22) PCT Filed: Sep. 10, 2015

(86) PCT No.: PCT/AU2015/050538
§ 371 (c)(1),
(2) Date: Mar. 13, 2017

(87) PCT Pub. No.: WO2016/041002
PCT Pub. Date: Mar. 24, 2016

(65) Prior Publication Data
US 2017/0238701 A1    Aug. 24, 2017

(30) Foreign Application Priority Data
Sep. 16, 2014   (AU) ................................ 2014903694

(51) Int. Cl.
*A47B 87/00*    (2006.01)
*A47B 47/00*    (2006.01)
*A47B 87/02*    (2006.01)

(52) U.S. Cl.
CPC ...... *A47B 47/0091* (2013.01); *A47B 87/0292* (2013.01); *A47B 87/008* (2013.01)

(58) Field of Classification Search
CPC . A47B 47/0091; A47B 47/00; A47B 47/0016; A47B 87/00; A47B 87/0284;
(Continued)

(56) References Cited

U.S. PATENT DOCUMENTS 3,563,624 A * 2/1971 Stice .................... A47B 47/042
                                                        312/107
3,790,241 A    2/1974 Messina
(Continued)

FOREIGN PATENT DOCUMENTS

CH    EP0960585 A2    12/1999
DE       3842051 A1    12/1989
(Continued)

OTHER PUBLICATIONS

Australian Patent Office, Written Opinion, PCT/AU2015/050538, dated Oct. 5, 2015, Woden Act 2606, Australia.
(Continued)

*Primary Examiner* — Daniel J Rohrhoff
(74) *Attorney, Agent, or Firm* — Louis Ventre, Jr.

(57) ABSTRACT

The invention provides a modular storage system (1), comprising a plurality of box-shaped structural units(2,3,4,5,6, 7,8,9,10,11,12,13,14), one or more of which are storage units used for storage, and each structural unit having front and back faces and left, right, top and bottom sides, wherein: the box-shaped structural units (2,3,4,5,6,7,8,9,10,11,12,13, 14) are laterally attachable to each other side-by-side through attachment points (30,31,32,33,74,79,97,99) on the left and right sides, thereby to construct a joined structure of at least two of the structural units; and one or more of the box-shaped structural units are reversible structural units, in which the corresponding attachment points are positioned and shaped so that the reversible structural unit is attachable in the lateral side-by-side attachment so that the corresponding front faces of adjacent joined structural units are oriented either in one direction or in opposite directions.

12 Claims, 11 Drawing Sheets

(58) Field of Classification Search
CPC . A47B 87/0292; A47B 87/007; A47B 87/008; A47B 87/0276
See application file for complete search history.

(56) References Cited

U.S. PATENT DOCUMENTS

| | | | | |
|---|---|---|---|---|
| 4,903,451 | A * | 2/1990 | Gresswell | A47B 87/0276 312/111 |
| 5,472,269 | A | 12/1995 | Novikoff | |
| 6,203,128 | B1 * | 3/2001 | Koziol | A47B 81/067 312/9.48 |
| 6,267,462 | B1 * | 7/2001 | Krause | A47B 87/007 312/108 |
| 6,732,858 | B1 * | 5/2004 | Chang Ou | A47B 87/0276 206/278 |
| 9,526,333 | B1 * | 12/2016 | Nielson | A47B 47/0091 |
| 2005/0200244 | A1 * | 9/2005 | Rouwhorst | A47B 87/008 312/111 |
| 2007/0145864 | A1 * | 6/2007 | Freedman | A47B 87/007 312/107 |
| 2008/0060964 | A1 * | 3/2008 | Beckley | A47B 87/0276 206/504 |
| 2011/0084042 | A1 * | 4/2011 | Ahlert | A47B 47/042 211/194 |
| 2012/0242200 | A1 * | 9/2012 | Keragala | A47B 47/042 312/111 |
| 2014/0007471 | A1 * | 1/2014 | Ottolenghi | A47B 87/0292 40/1 |
| 2014/0225484 | A1 * | 8/2014 | De Roeck | A47B 87/0292 312/111 |
| 2015/0108880 | A1 * | 4/2015 | Chung | A47B 87/0292 312/108 |
| 2016/0095430 | A1 * | 4/2016 | Moyer | A47B 47/0091 312/265.4 |

FOREIGN PATENT DOCUMENTS

| | | |
|---|---|---|
| DE | WO9115015 A1 | 10/1991 |
| DE | 29723814 U1 | 6/1999 |
| EP | 2567634 A1 | 3/2013 |
| FR | 2929497 A1 | 10/2009 |
| JP | WO2006035742 A1 | 4/2006 |

OTHER PUBLICATIONS

European Patent Office, Supplementary Search Report, EP15842971, dated Feb. 9, 2018, 80298 Munich, Germany.

* cited by examiner

MODULAR STORAGE SYSTEM

FIELD

The present invention relates to storage systems, particularly but not limited to storage systems for deployment in offices, sports facilities, factories, teaching and health related institutions and the like.

BACKGROUND

With the increasing flexible work practices and team based management structures, the ability to reconfigure workspaces easily and cost effectively has become particularly important. There is a need for improved modular storage systems that are able to be adapted quickly and flexibly to changing shapes and sizes of workspaces which are characteristic of flexible work practices.

More generally, there is always the need for improved modular storage systems that offer new elements of flexibility in design of walls, partitions, cabinets and the like out of multipurpose structural units.

SUMMARY OF THE INVENTION

In accordance with a broad aspect of the invention there is provided a modular storage system, comprising a plurality of box-shaped structural units, one or more of which are storage units used for storage, and each structural unit having front and back faces and left, right, top and bottom sides, wherein:

the box-shaped structural units are laterally attachable to each other side-by-side through attachment points on the left and right sides, thereby to construct a joined structure of at least two of the structural units; and one or more of the box-shaped structural units are reversible structural units, in which the corresponding attachment points are positioned and shaped so that the reversible structural unit is attachable in the lateral side-by-side attachment so that the corresponding front faces of adjacent joined structural units are oriented either in one direction or in opposite directions.

In one embodiment, one or more of the box shaped structural units are service accessible structural units comprising spacing elements on the left and right side which results in a vertical gap in the joined structure between adjacent left or right sides of the joined structural units suitable to provide part of a service access path between the structural units through which electrical cabling, communications cabling or other services may be passed.

In one embodiment, the box shaped structural units are also stackable vertically.

In one embodiment, at least some of the service accessible structural units further comprise spacing elements on the top and bottom side which results in a horizontal gap in the joined structure between adjacent top or bottom sides of vertically adjacent structural units suitable to provide part of the service access path.

In one embodiment, the spacing elements are provided at least in part by raised vertical front and back edges on the left and right sides that serve to provide the vertical gap between the raised edges and also hide the vertical gap from a front or rear perspective of the joined structure.

In one embodiment, one or more of the service accessible structural units further comprise spacing elements on the top and bottom side which results in a horizontal gap in the joined structure between adjacent top or bottom sides of vertically adjacent structural units suitable to provide part of the service access path, and the spacing elements on the top and bottom side are provided at least in part by raised horizontal front and back edges on the top and bottom sides that serve to provide the horizontal gap between the raised edges and also hide the horizontal gap from a front or rear perspective of the joined structure.

In one embodiment, the reversibly attachable structural units are attachable through one or more fasteners suitably sized and shaped to engage and hold together corresponding attachment points on the left or right sides of adjacent structural units the attachment points and fasteners being positioned and sized and shaped to allow the reversible attachment.

In one embodiment, the box shaped structural units are also stackable vertically, and some of the structural units have different heights which are integer multiples of a fundamental height.

In one embodiment, the reversibly attachable structural units are attachable through one or more fasteners suitably sized and shaped to engage and hold together corresponding attachment points on the left or right sides of adjacent structural units, and wherein the attachment points are spaced vertically according to the fundamental height thereby to allow free stacking of the structural units having different heights and still allowing the side-by-side reversible attachment.

In one embodiment, the reversible structural units are reversible from one attachable orientation to another by a 180° rotation about a horizontal axis so that when reversed the reversible structural unit has top and bottom sides exchanged, and the attachment points are positioned symmetrically with respect to the fundamental height so as to allow the side-by-side reversible attachment by the 180° rotation about the horizontal axis.

In one embodiment, the reversible structural units are reversible from one attachable orientation to another by a 180° rotation about a horizontal axis so that when reversed the structural unit has top and bottom sides exchanged, and the attachment points are positioned symmetrically with respect to the top and bottom sides of the reversible structural units so as to allow the side-by-side reversible attachment by the 180° rotation about the horizontal axis.

In one embodiment, the reversible structural units are reversible from one attachable orientation to another by a 180° rotation about a vertical axis so that when reversed the structural unit retains the orientation of top and bottom sides, and the attachment points are positioned and shaped symmetrically on the left and right sides of the reversible structural unit so as to allow the side-by-side reversible attachment by the 180° rotation about the vertical axis.

In one embodiment, the reversibly attachable structural units are attachable through one or more fasteners suitably sized and shaped to engage and hold together corresponding attachment points on the left or right sides of adjacent structural units, the attachment points and fasteners being positioned and sized and shaped to allow the reversible attachment, and wherein the attachment points are disposed on the raised vertical front and back edges.

In one embodiment, the attachment points comprise apertures to receive the insertion of the body or head parts of the fastener and slots connecting with the apertures to receive fastening engagement with a neck part of the fastener, so that when joined together corresponding attachment points are joined together by the fastener at the corresponding slots.

DETAILED DESCRIPTION OF EMBODIMENTS

Figure 1:
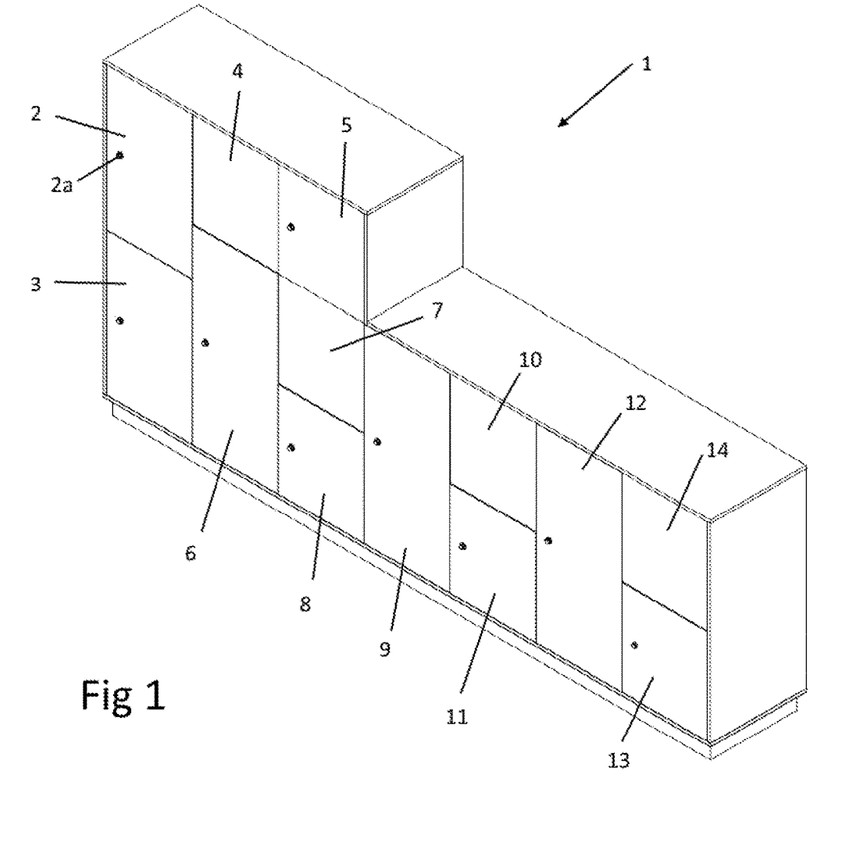
FIG. 1 is a perspective view of a fully assembled joined structure of a number of structural units of an embodiment of the modular storage system according to the invention.

Referring first to FIG. 1, a fully assembled joined structure 1 in the form of a cabinet constructed from an embodiment of the modular storage system is shown. The joined structure 1 comprises a plurality of box shaped structural units numbered 2-14, which also function as storage units having front faces incorporating doors with handles such as 2a and opposite back faces which are closed, as well as top, bottom, left and right sides which are also substantially closed (hidden).

In this description and the claims, the front and back faces are defined by a difference in feature or function, such as the presence of a door in the front face and the presence of a closed back face, or if the faces are identical front and back may be arbitrarily assigned. The left and right sides are defined as viewed from the front as defined above. Top and bottom sides are defined by the intended orientation with respect to gravity, which may be interchanged for the reversible units as described below.

The storage units 2-14 in FIG. 1 are all reversible structural units, being reversibly laterally attachable side-by-side to one another so that they have their corresponding front faces oriented in one direction, as seen by units 2, 3, 6, 5, 8, 9, 11, 12, 13 with front faces and doors visible, or in an opposite direction, as seen by units 4, 7, 10, 14 with closed rear faces visible. The storage units 2-14 are attachable side-by-side independently facing either way. Some are also stacked vertically, and some of the storage units have different heights which are integer multiples of a fundamental height (which in this case is half the height of the shortest shown units such as 4 and 5) allowing regular shaped cabinets or partition walls to be constructed from different combinations of storage unit heights. For example, storage units 2 and 3 are each 3 times the fundamental height, totalling 6, whereas storage units 4 and 6 are 2 and 4 times the fundamental height, also totalling 6, and storage units 5, 7 and 8 are each 2 times the fundamental height, totalling 6 again.

Figure 2:
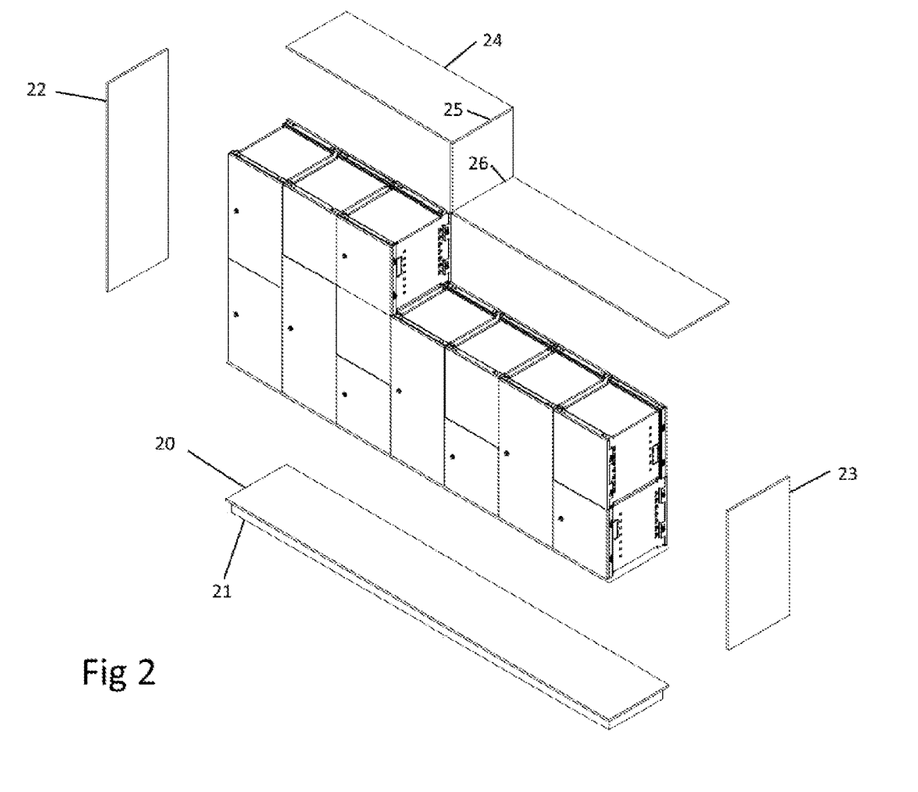
FIG. 2 shows the joined structure of FIG. 1 disassembled from support and cladding elements.

Referring now to FIG. 2, the cabinet of FIG. 1 is shown with support elements disassembled in the form of pedestal 21 and base 20, and cladding elements 22, 23 and 24 also disassembled. The cladding elements in this embodiment are constructed from sheet metal and top cladding element 24 has folds 25 and 26 to correspond with the contour of the constructed cabinet.

Figure 3:
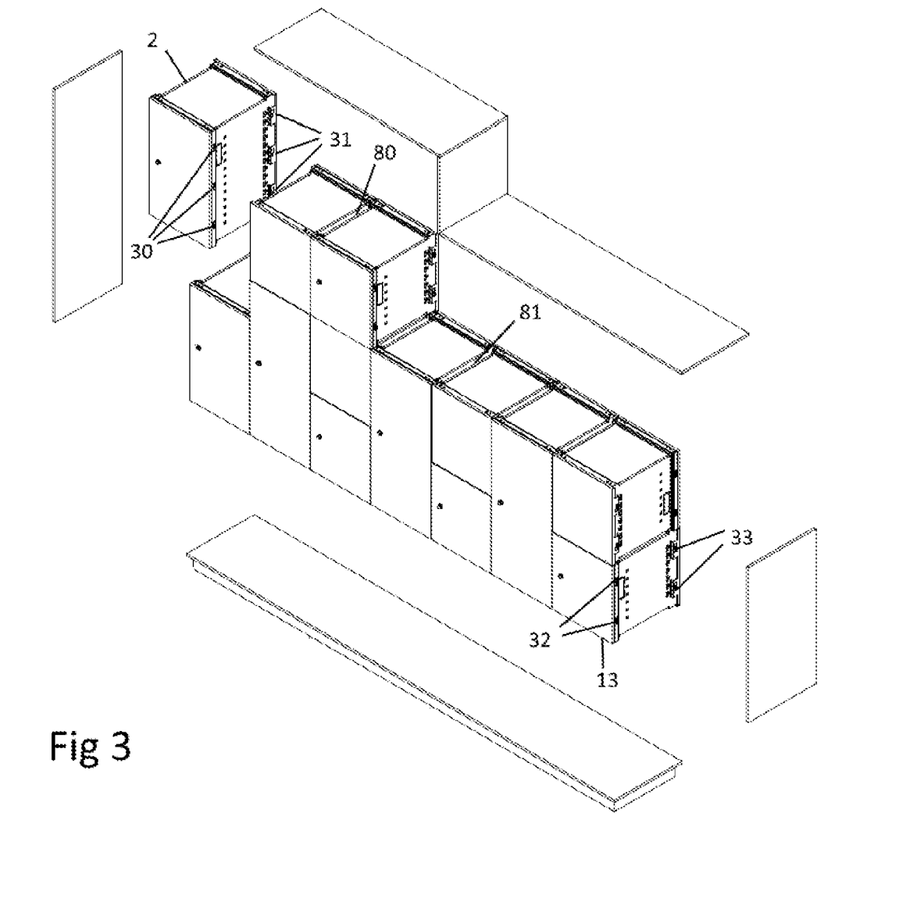
FIG. 3 shows further disassembly of the joined structure of FIG. 1 revealing attachment points and other structures.

Referring now to FIG. 3, the cabinet of FIG. 1 is shown with one of the storage units 2 unattached and top or right sides of other storage units exposed. Storage unit 2 is 3 times the fundamental height and has 3 attachment points 30 on a raised front edge of its right side and 3 attachment points 31 on a raised back edge of its right side. Storage unit 13 is 2 times the fundamental height and has 2 attachment points 32 on a raised front edge of its right side and 2 attachment points 33 on a raised back edge of its right side. When attached together laterally side-by-side, the raised edges (which are also present on the corresponding left sides) on adjacent units engage to define a vertical gap such as 80, 81 suitable to provide part of a service access path between the structural units through which electrical cabling, communications cabling or other services may be passed, for example in order to provide electrical power to power points within the storage units.

Figure 4:
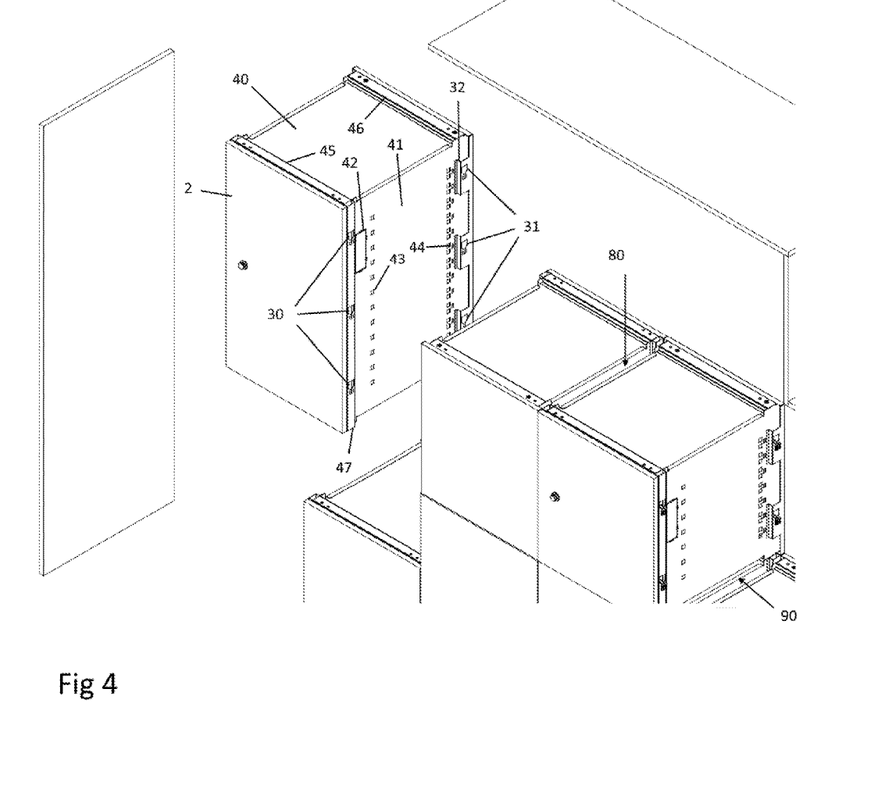
FIG. 4 shows a close-up of a part of FIG. 3 with further details.

Referring now to FIG. 4, storage unit 2 can be seen in close-up with further details revealed. Storage unit 2 is constructed primarily from folded sheet metal. The right side 41 (and a left side not visible) comprises shelf attachment holes 43, 44 and from inside the storage unit 2 presents a smooth interior surface to the user. Also provided is a frangible cutout section 42 which can be broken off to allow installation of electrical power outlet or otherwise an entry point from the service access path. Raised front edge 47 on right side 41 is also constructed from sheet metal and comprises 3 attachment points 30 consisting of an aperture and slot arrangement to be described below. Raised rear edge 32 also on right side 41 and also constructed from sheet metal comprises 3 attachment points 31 also consisting of an aperture and slot arrangement positioned vertically in the same level as attachment points 30 but positioned horizontally slightly inwards from the edge compared to attachment points 30 to take account of the thickness of the door 2 so as to be able to provide a uniformly flush front surface when the storage unit is oriented in either direction using the reversing feature to be described below.

Figure 5:
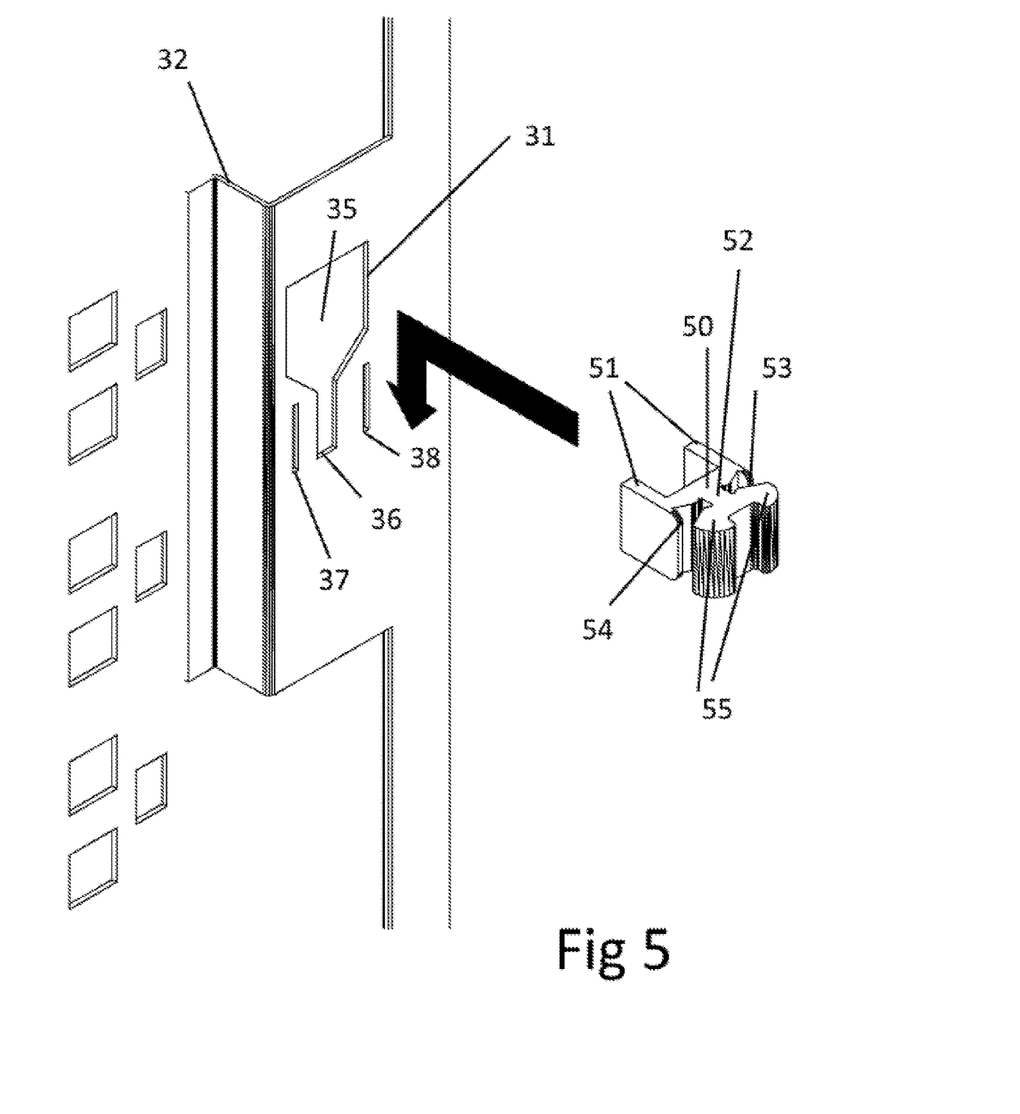
FIGS. 5, 6, 7 and 8 show details of operation of attachment of one structural unit to another according to this embodiment of the invention.
Figure 6:
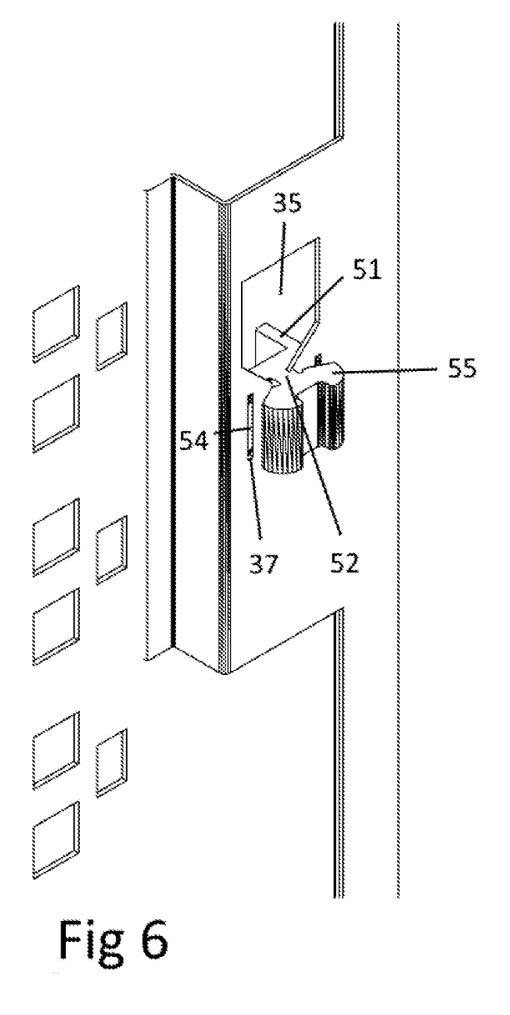

Referring now to FIG. 5, details of the attachment points 31 on the right side of storage unit 2 are shown, with an aperture 35 connecting in a downwards direction to a slot 36, and also incorporating locating apertures 37 and 38. Extruded aluminium clip 50 (plastic may also be acceptable) comprises a neck portion 52 widening in one direction into a body portion incorporating legs 51 at a top end of which are positioning lugs 53 and 54, and widening in another direction into a head portion 55. Aperture 35 is sized and shaped to allow insertion of legs 51 so that only the neck portion 52 and head portion 55 is extending out of aperture 35, and slot 36 enables downwards translation of clip 50 so that neck 52 is positioned within slot 36, in an installation movement depicted by the bold arrow. As shown in FIG. 6, in the installed position of clip 50, lugs 53 and 54 snap into locating apertures 37 and 38 sufficiently to hold the clip in place, without protruding substantially or at all through to the other side. Locating apertures 37 and 38 are important to retain clip 50 in place particularly when storage unit 2 is positioned in the first orientation and attachment point 31 is upside down with the slot facing upwards and the clip would otherwise fall out of the slot 36 (to be described in relation to FIG. 9).

Figure 7:
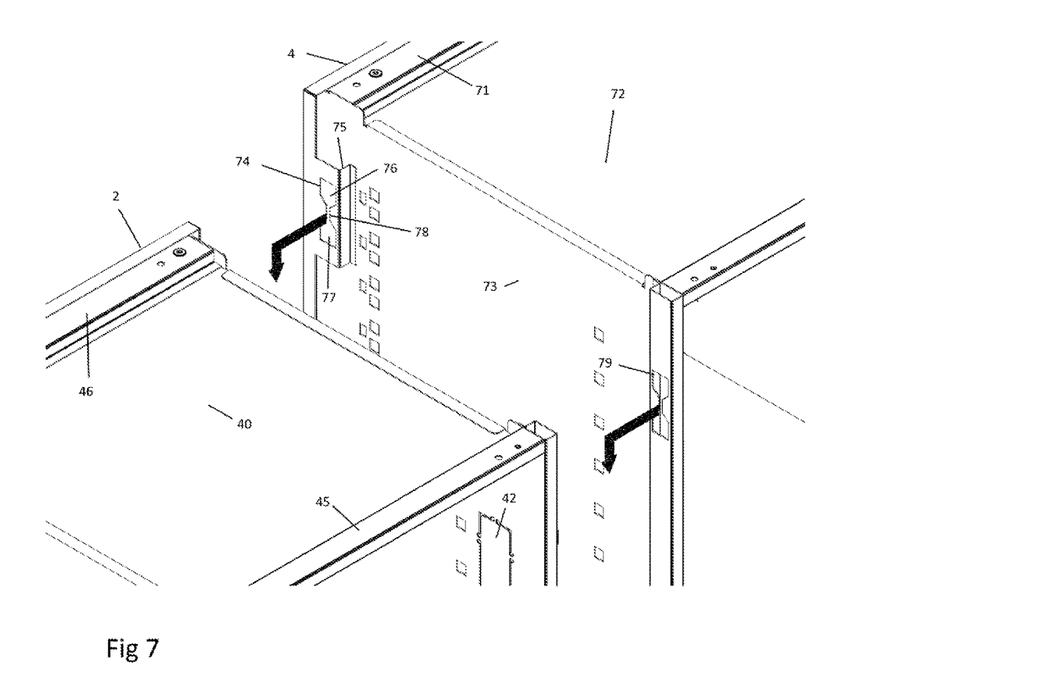

Referring now to FIG. 7, where storage unit 2 is shown with door 2a removed, in the process of being connected to storage unit 4 from the opposite perspective, after previously described insertion and installation of clip 50. Storage unit 4 is essentially similar to storage unit 2 except that it is 2 times the fundamental height (not shown in this diagram).

Figure 8:
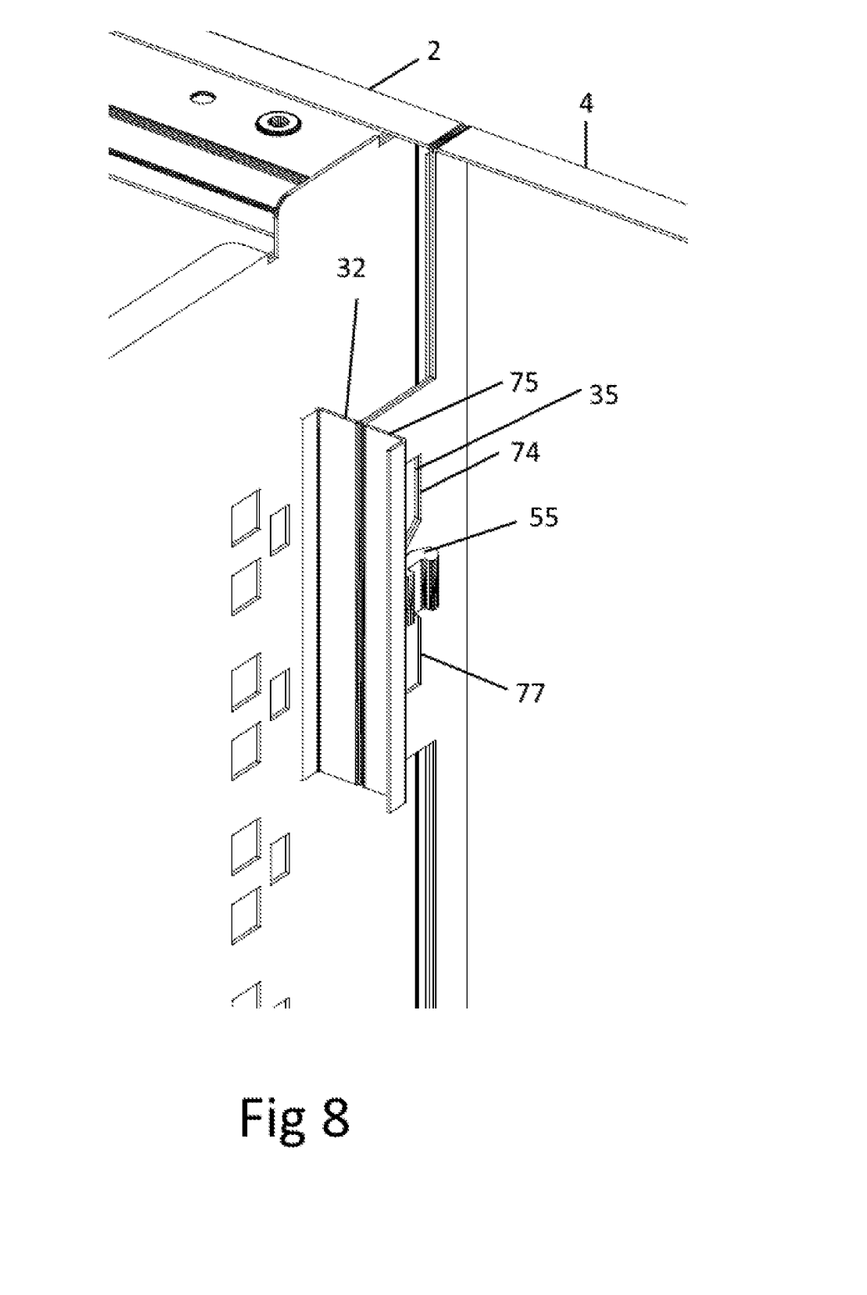

Storage unit 4 is in the process of being attached in the same orientation as storage unit 2, with both front faces in the same orientation. On the left side 73 of storage unit 4 (similarly on the unseen left side of storage unit 2) are attachment points 74 and 79 (and also similar lower attachment points) positioned such that the slots 78 are destined to positionally match slot 36 when attached. In the attachment process, the head 55 of clip 50 passes into aperture 77 (and similarly with a corresponding clip in relation to attachment point 79) and slot 78 slides down onto neck 52 of clip 50. Referring to FIG. 8, the back face of storage unit 4 is shown attached laterally to storage unit 2 with other elements of storage unit 4 omitted to be able to show the registering of apertures 35 and 74 on the respective storage units with slots 36 and 78 positionally matched and head 55 in position securing the 2 attachment points firmly together.

Referring back to FIG. 7, it can also be seen that back top edge 46 and front top edge 45 of storage unit 2 are raised above panel 40 of the top side of storage unit 2, and similarly in relation to storage unit 4, enabling provision when stacked vertically to define a horizontal gap such as 90 shown in FIG. 4 as part of an access path for electrical cabling or similar.

Figure 9A:
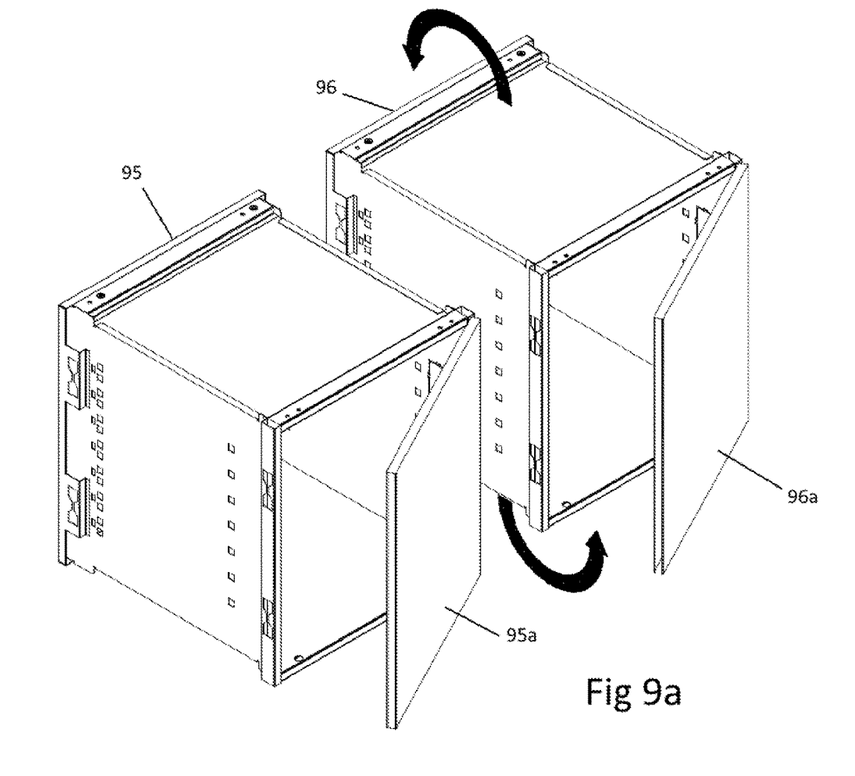
FIGS. 9a and 9b show the method of operation of the reversible structural units according to this embodiment of the invention.
Figure 9B:
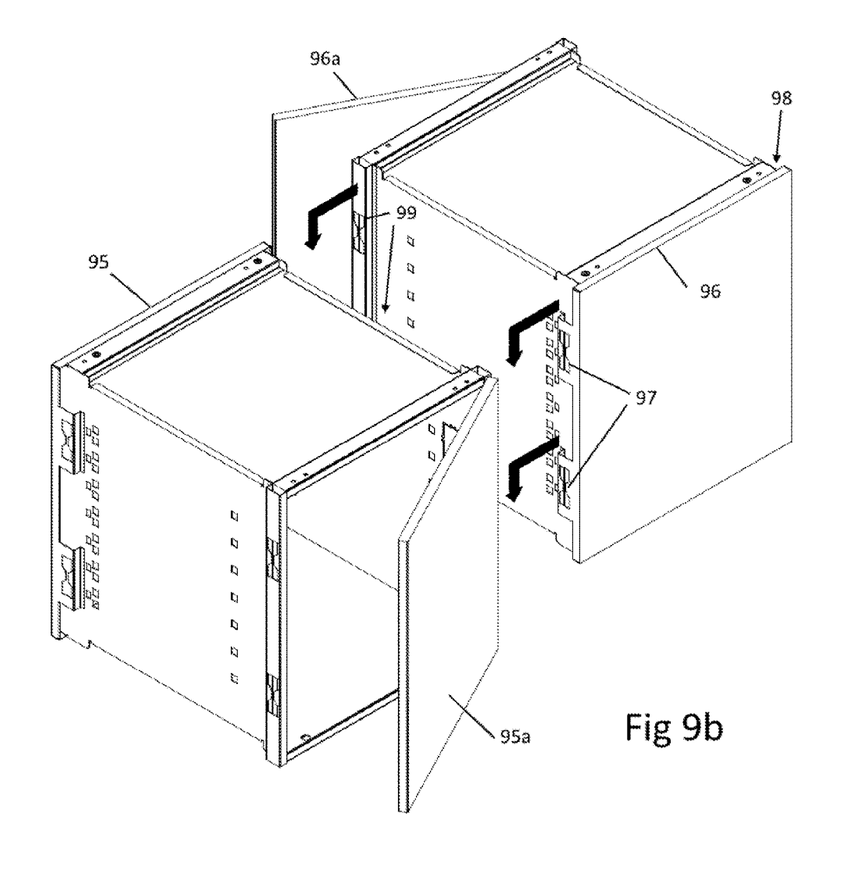

Referring now to FIGS. 9a and 9b, the operation of the reversible attachment feature of the storage units is depicted. The storage units have back faces 95 and 96 and are identical storage units of 2 fundamental units high similar to storage unit 4. They are shown in FIG. 9a oriented with their front faces and attached front doors 95a and 96a pointing in one orientation, and as described previously are attachable in that same orientation. The reverse orientation is achieved by rotating one storage unit about a horizontal axis as shown in FIG. 9a so that the front faces now face in opposite directions, and the top and bottom sides are interchanged as shown in FIG. 9b. As the left side attachment points 97,99 have symmetrical apertures both above and below the connecting slot, and are positioned symmetrically with respect to the top and bottom sides, the four apertures 97,99 together occupy the same relative four positions in the reverse orientation and can be attached. It will be appreciated that an additional desirable feature of this embodiment, to enable a flush front and rear appearance of the joint structure, is that the position of the rear set of positioning slots 97 with respect to the outer surface of the rear face 96 matches the position of the front set of positioning slots 99 with respect to the outer surface of the front door 96a.

Figure 10:
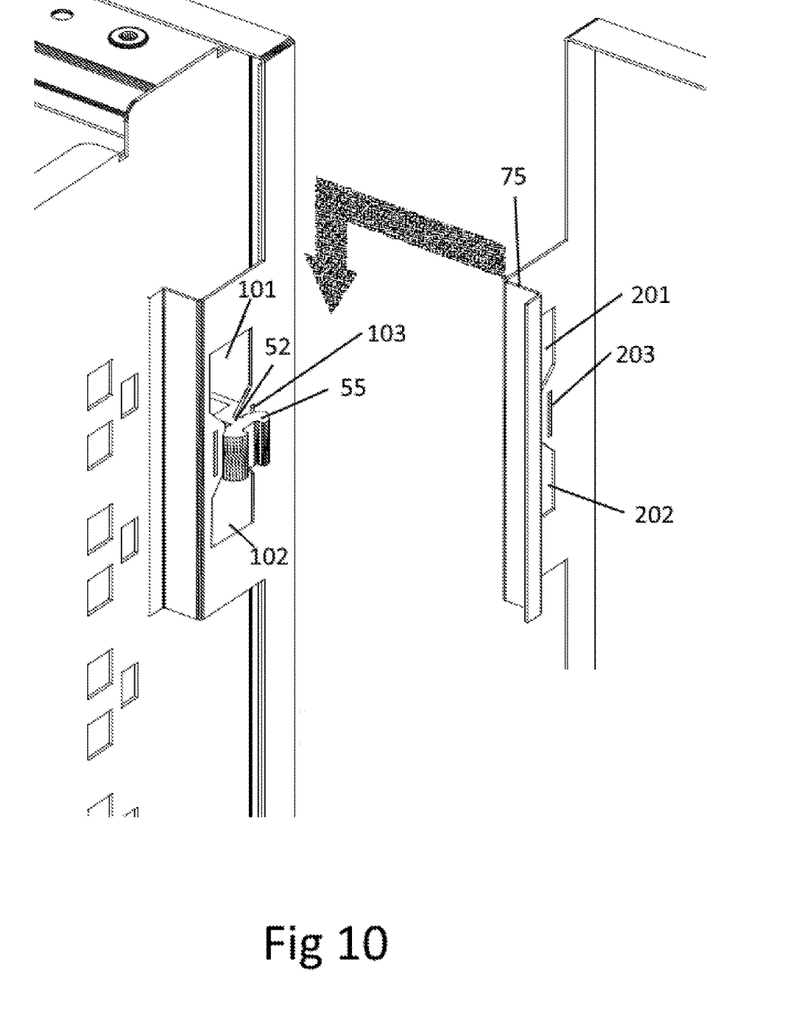
FIG. 10 shows details of attachment points according to an alternative embodiment of the invention.

An alternative embodiment of the reversibility feature is described in FIG. 10, wherein the attachment points on both mating sides have the same shape, comprising upper and lower apertures 101, 102 and 201, 202 connected by a central slot, the same as 97, 99 in FIG. 9b, and both attachment points on both mating sides also comprise locating apertures 103, 203. This enables the clip 50 to be installed in either side and as there is a complete symmetry, enables reversible attachment by rotation about a vertical axis whereby the reversed structural unit retains the identification of top and bottom sides, and also enables reversible attachment by rotation about a horizontal axis as described previously.

It will be appreciated that in order to provide reversible structural units which also have different heights that are multiples of the fundamental height, the attachment points must be symmetrically placed with respect to the fundamental height. In the embodiment shown here, the attachment points are located (i.e. with their locating slots) in the centre or symmetrically with respect to the halfway point of one fundamental height. Accordingly, for storage units which are 2 fundamental units high such as shown in FIG. 9a and FIG. 9b, attachment points are located at 0.5 and 1.5 fundamental units in height. For storage units such as storage unit 2 in FIG. 3, the attachment points are located at 0.5, 1.5 and 2.5 fundamental units in height.

It will be appreciated that the modular storage system described above can be used to construct partitions, low or high walls, cabinets and the like, applicable to offices, workshops, locker rooms and similar premises. The ability to reverse individual structural units enables flexible storage and other uses to be contemplated.

Persons skilled in the art will also appreciate that many variations may be made to the invention without departing from the scope of the invention, which is determined from the broadest scope and claims.

For example, while the embodiments shown above all show storage units with front doors and closed back face and closed sides, structural units having an open, openable or closed sides and faces are within the scope of the invention. Further, the invention relates in its broadest aspect to systems which comprise additional reversible box-shaped structural units which may not be storage units, and/or additional box-shaped structural units that are not reversible.

Further still, while the attachment points in the embodiment above comprise apertures and slots fastened by clips, many other forms of attachment point are contemplated that can also come within the broadest aspect of the invention. For example, in the crudest embodiments, attachment points may simply be provided by appropriately positioned holes in the sides that are fastened by nuts and bolts.

Further also, while the embodiments above contemplate attachment which is aesthetically appealing and hidden, simpler and cheaper embodiments are envisaged where the fastening means projects through the sides of the storage units and are visible from within the storage units. Such embodiments may be particularly practical if the structural units are constructed from wood derived materials such as MDF. All suitable construction materials are within the scope of the invention.

The term "system" in the claims refers to a collection of elements for modular construction having the claimed features.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. Further, any method steps recited in the claims are not necessarily intended to be performed temporally in the sequence written, or to be performed without pause once started, unless the context requires it.

It is to be understood that, if any prior art publication is referred to herein, such reference does not constitute an admission that the publication forms a part of the common general knowledge in the art, in Australia or any other country.

The invention claimed is:

1. A modular storage system, comprising a plurality of box-shaped structural units, one or more of which are storage units used for storage, and each structural unit having front and back faces and left, right, top and bottom sides, wherein:

the box-shaped structural units are laterally attachable to each other side-by-side through corresponding attachment points on the left and right sides, thereby to construct a joined structure of at least two of the boxed-shaped structural units;

one or more of the box-shaped structural units are reversible structural units, in which the corresponding attachment points are positioned and shaped so that each of the reversible structural units is attachable in the lateral side-by-side attachment so that the corresponding front faces of the boxed-shaped structural units in the joined structure are oriented either in one direction or in opposite directions and one or more of the box shaped structural units are service accessible structural units comprising spacing elements on the left and right sides which result in a vertical gap in the joined structure between adjacent left or right sides of the joined structural units suitable to provide part of a service access path between the box-shaped structural units through which electrical cabling, communications cabling or other services may be passed; and the spacing elements are provided at least in part by raised vertical front and back edges on the left and right sides that serve to provide the vertical gap between the raised vertical front and back edges and also hide the vertical gap from a front or rear perspective of the joined structure by making contact with each other.

2. The modular storage system of claim 1, wherein the box shaped structural units are also stackable vertically.

3. The modular storage system of claim 2, wherein one or more of the service accessible structural units further comprise spacing elements on the top and bottom side which results in a horizontal gap in the joined structure between adjacent top or bottom sides of vertically adjacent structural units suitable to provide part of the service access path.

4. The modular storage system of claim 1, wherein one or more of the service accessible structural units further comprise spacing elements on the top and bottom side which results in a horizontal gap in the joined structure between adjacent top or bottom sides of vertically adjacent structural units suitable to provide part of the service access path, and the spacing elements on the top and bottom side are provided at least in part by raised horizontal front and back edges on the top and bottom sides that serve to provide the horizontal gap between the raised edges and also hide the horizontal gap from a front or rear perspective of the joined structure.

5. The modular storage system of claim 1, wherein the reversibly attachable structural units are attachable through one or more fasteners suitably sized and shaped to engage and hold together the corresponding attachment points on the left or right sides of adjacent structural units, the corresponding attachment points and fasteners being positioned and sized and shaped to allow the reversible attachment, and wherein the corresponding attachment points are disposed on the raised vertical front and back edges.

6. The modular storage system of claim 1, wherein the reversibly attachable structural units are attachable through one or more fasteners suitably sized and shaped to engage and hold together the corresponding attachment points on the left or right sides of adjacent structural units, the corresponding attachment points and fasteners being positioned and sized and shaped to allow the reversible attachment.

7. The modular storage system of claim 6, wherein the reversible structural units are reversible from one attachable orientation to another by a 180° rotation about a horizontal axis so that when reversed the structural unit has top and bottom sides exchanged, and the corresponding attachment points are positioned symmetrically with respect to the top and bottom sides of the reversible structural unit so as to allow the side-by-side reversible attachment by the 180° rotation about the horizontal axis.

8. The modular storage system of claim 6, wherein the reversible structural units are reversible from one attachable orientation to another by a 180° rotation about a vertical axis so that when reversed the structural unit retains the orientation of top and bottom sides, and the corresponding attachment points are positioned and shaped symmetrically on the left and right sides of the reversible structural unit so as to allow the side-by-side reversible attachment by the 180° rotation about the vertical axis.

9. The modular storage system of claim 6, wherein the corresponding attachment points comprise apertures to receive the insertion of the body or head parts of the fastener and slots connecting with the apertures to receive fastening engagement with a neck part of the fastener, so that when joined together the corresponding attachment points are joined together by the fastener at the slots.

10. The modular storage system of claim 1, wherein the box shaped structural units are also stackable vertically, and some of the structural units have different heights which are integer multiples of a fundamental height.

11. The modular storage system of claim 10, wherein the reversibly attachable structural units are attachable through one or more fasteners suitably sized and shaped to engage and hold together the corresponding attachment points on the left or right sides of adjacent structural units, and wherein the corresponding attachment points are spaced vertically according to the fundamental height thereby to allow free stacking of the structural units having different heights and still allowing the side-by-side reversible attachment.

12. The modular storage system of claim 11, wherein the reversible structural units are reversible from one attachable orientation to another by a 180° rotation about a horizontal axis so that when reversed the reversible structural unit has top and bottom sides exchanged, and the corresponding attachment points are positioned symmetrically with respect to the fundamental height so as to allow the side-by-side reversible attachment by the 180° rotation about the horizontal axis.

* * * * *